United States Patent [19]

Suzuki et al.

[11] Patent Number: 5,191,474
[45] Date of Patent: Mar. 2, 1993

[54] ANAMORPHIC ILLUMINATING OPTICAL SYSTEM

[75] Inventors: Sanae Suzuki; Nobuo Kanai, both of Osaka, Japan

[73] Assignee: Minolta Camera Kabushiki Kaisha, Osaka, Japan

[21] Appl. No.: 525,905

[22] Filed: May 18, 1990

[30] Foreign Application Priority Data

May 18, 1989 [JP] Japan ................................ 1-125265
Jan. 12, 1990 [JP] Japan ................................ 2-5779
Jan. 12, 1990 [JP] Japan ................................ 2-5780
Jan. 12, 1990 [JP] Japan ................................ 2-5781

[51] Int. Cl.$^5$ .......................................... G02B 13/08
[52] U.S. Cl. .................................. 359/668; 359/710; 359/711
[58] Field of Search ............... 350/420, 433, 474, 452, 350/422; 358/401; 359/793, 711

[56] References Cited

U.S. PATENT DOCUMENTS 2,720,813 10/1955 Cox ..................................... 350/474
4,278,334 7/1981 Maeda ................................ 355/69
4,756,583 7/1988 Morimoto ........................... 350/474
4,825,243 4/1989 Ito et al. ............................. 355/41

Primary Examiner—Bruce Y. Arnold
Assistant Examiner—James Phan
Attorney, Agent, or Firm—Price, Gess & Ubell

[57] ABSTRACT

An illuminating optical system for use in a microfilm reader/printer or the like for illuminating a film comprises an axially symmetric lens system and an anamorphic lens system. The anamorphic lens system includes a condenser lens opposed to a light source. The microfilm reader/printer having such an illuminating optical system causes the axially symmetric lens system to illuminate the microfilm during a reading operation, and the anamorphic lens system to illuminate the film during a printing operation.

6 Claims, 15 Drawing Sheets

A = 18.0
B = 22.0

A = 23.0
B = 18.0

—·— OPTICAL PASS AT READING
----- OPTICAL PASS AT PRINTING

ANAMORPHIC ILLUMINATING OPTICAL SYSTEM

TECHNICAL FIELD

The present invention relates to an anamorphic illuminating optical system for line illumination, and particularly to such an anamorphic illuminating optical system for use in a microfilm reader/printer or the like.

BACKGROUND OF THE INVENTION

In a conventional microfilm analog printer of the slit exposure type, a microfilm is illuminated and scanned by a film scan method or a lens scan method. With such an apparatus, generally, illumination has heretofore been provided by using a condenser lens system symmetric about an optical axis as an illuminating system.

An anamorphic flash device is known from Japanese Utility Model Publication Kokai No. 49-74241, for example. This device comprises a projector and a beam gun producing an effect comparable to a spot light source by combining an elongated flash tube and an anamorphic lens or a mirror with a spherical condenser lens.

With the condenser lens system symmetric about an optical axis in an ordinary illuminating optical system, illuminating light in a line or slit form is sufficient. However, the system is constructed to cause the light to illuminate areas transversely of the slit also. This results in some parts of the beam being wasted and the illuminating optical system itself being a large entity. Further, the device disclosed in the above Japanese publication has a light source limited to the elongated flash tube.

Such an illuminating optical system typically is used in a microfilm reader/printer. In view of this, a conventional microfilm reader/printer will now be described.

FIG. 16 is a sectional view of an optical system in a microfilm reader/printer of the film scan type as engaged in a printing operation. As shown, a microfilm 1005 is illuminated in a line form by illuminating light traveling thereto directly from a light source 1002 or after being reflected by a reflecting mirror 1001, through a condenser lens system 1004 which condenses the light. An image of microfilm 1005 illuminated in a line form is projected by a projecting lens system 1006 through a slit 1007 onto a photoreceptor drum 1008 rotating at velocity VI as indicated by an arrow, thereby forming a line image on the drum 1008. At this time, the microfilm 1005 is moved upward at velocity VO as indicated by an arrow. That is, the microfilm 1005 is moved at velocity VO which takes the rotating velocity VI of the photoreceptor drum 1008 and a projecting magnification ratio into account. The image is projected onto the photoreceptor drum 1008 with the slit 7 extending in the direction perpendicular to the sheet of drawings.

FIG. 17 is a sectional view of an optical system in a microfilm reader/printer of the lens scan type, in which a microfilm 1005 is held stationary. This optical system comprises a light source 1009 including a reflecting mirror, a condenser lens system 1010 and a projecting lens system 1006 arranged coaxially with one another are moved upward at velocity VL as indicated by an arrow for illuminating the microfilm 1005 linearly. An image of the illuminated microfilm 1005 is projected by the projecting lens system 1006 moving upward in synchronism with the light source 1009 and condenser lens system 1010, through a slit 1007 onto a photoreceptor drum 1008 rotating at velocity VI as indicated by an arrow, thereby forming an image on the drum 1008. In this case also, the moving velocity VL takes the rotating velocity VI of the photoreceptor drum 1008 and a projecting magnification ratio into account.

SUMMARY OF THE INVENTION

An object of the present invention is to provide an anamorphic illuminating optical system having an improved line illuminating efficiency, and a projecting device employing such an illuminating optical system.

The above object is fulfilled, according to the present invention, by an illuminating optical system comprising an axially symmetric lens system and an anamorphic lens system.

In a preferred embodiment of the invention, the anamorphic lens system includes a condenser lens or a fresnel lens. According to this construction, illuminance may be obtained efficiently in the direction of the line by varying the image-forming magnification by the condenser lens of a source image on the pupil of the projecting lens between a direction of the slit and a direction perpendicular thereto. Further, a small light source having the same illuminance may be employed to obtain the same luminance as the axially symmetric lens system. It is also possible to lower illuminance with the same light source size if the beams from the light source do not overflow the pupil in the projecting lens system. That is, the anamorphic lens system improves the efficiency of the illuminating system, thereby to realize reduced power consumption by the light source.

It is further possible to increase the difference in magnification between the meridional direction and the sagittal direction by placing the anamorphic lens at a position closest to the light source. This is due to the least influence of the spherical aberration caused by the cylindrical lens.

Illuminance may be increased while maintaining the illuminance ratio in the direction of the line.

In a further preferred embodiment of the present invention, the anamorphic lens system includes a toroidal lens in the case of an optical system which provides a line illumination or an illuminated range with greatly different lengths in two directions intersecting at right angles when a given point acts as an original point. Then, as in the foregoing embodiment, a small light source having the same illuminance may be employed to obtain the same luminance as the axially symmetric lens system. Power consumption may also be reduced. The anamorphic lens system may be used to increase illuminance if the beams do not overflow the pupil in the projecting lens.

It is also possible to avoid damage done to the lenses due to the thermal gradient in the direction perpendicular to the line.

In a further aspect of the present invention, the above anamorphic illuminating optical system is used in a projecting apparatus such as a microfilm reader/printer.

Where the axially symmetric lens system includes a cylindrical lens, illuminance and illuminance ratio may be obtained in the same levels during a reading operation as in the conventional illuminating system. In addition, during a printing operation, anamorphic illumination may be provided which increases condenser magnification in the direction perpendicular to the slit. This promotes illuminating efficiency to enable an increase in exposing illuminance during a printing operation. Consequently, an increased number of copies may be taken easily within a fixed time by increasing exposure speed.

In the case of a projecting apparatus having a toroidal lens included in the axially symmetric lens system, illuminance and illuminance ratio may be obtained in the same levels during a reading operation as in the conventional illuminating system. In addition, during a printing operation, anamorphic illumination may be provided which increases condenser magnification in the direction perpendicular to the slit. This promotes illuminating efficiency to enable an increase in exposing illuminance during a printing operation. Consequently, an increased number of copies may be taken easily within a fixed time by increasing exposure speed.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Several embodiments of the present invention will be described hereinafter with reference to the drawings.

First Embodiment

Figure 1:
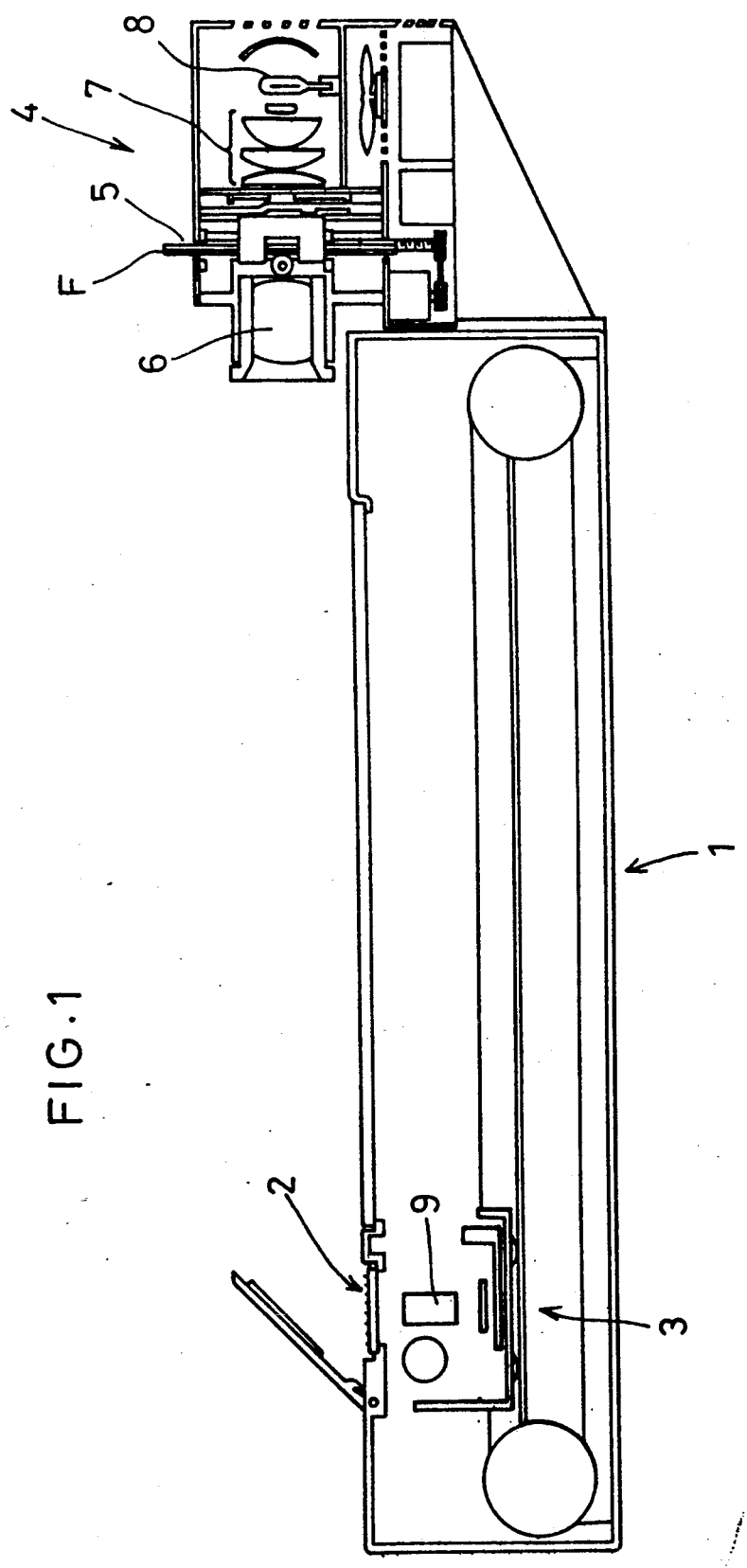
FIG. 1 is a sectional view of an image reading apparatus for 35 mm films employing an anamorphic illuminating optical system according to the present invention.

FIG. 1 is a sectional view, taken in a direction perpendicular to a line, of an illuminating system of a projector or image reading apparatus for 35 mm films. A main apparatus body 1 comprises a projection station 2, and a projector 4 acting as an illuminating system. The projector includes a light source 8 for emitting illuminating light which is condensed by a condenser lens system 7 to illuminate a film F supported by a film holder 5. An image range in a slit form extending perpendicular to the sheet of the drawing is illuminated and projected by a projecting lens system 6 to the projection station 2. The projected image is read by a reading station 3 including a CCD 9. At this time, the film F is moved vertically and parallel to the sheet of the drawing, whereby images over an entire area of the film F are line-scanned and read.

Figure 2A:
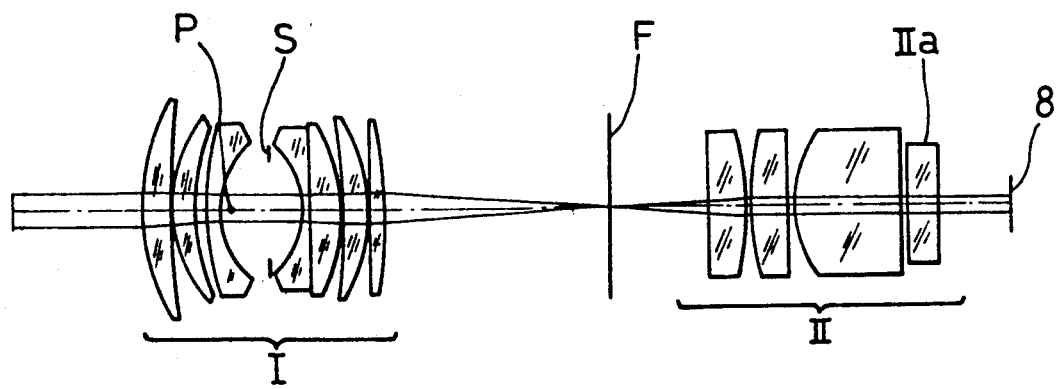
FIGS. 2A through 2C are views of optical paths illustrating an anamorphic illuminating optical system in a first embodiment of the present invention.
Figure 2B:
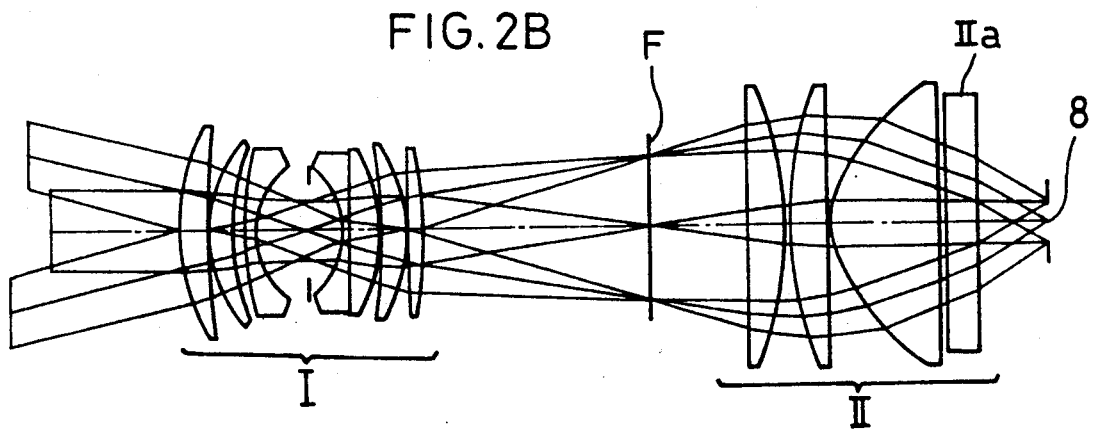

The condenser lens system of the above projector will be described next. FIGS. 2A and 2B are sectional views of an optical system, in which FIG. 2A shows a sagittal section in a direction perpendicular to the slit, and FIG. 2B shows a meridional section in the direction of the slit. The illustrated construction comprises, arranged from the left, enlargement side, the projecting lens system I, the 35 mm film F, the condenser lens system II including a symmetric system about the optical axis and a plain flat plate IIa, and the light source 8.

A pupil P is selected as a plane showing the condition of a beam width of the projecting lens system I, and the light source filament 8 is assumed to have a rectangular shape. FIG. 2D shows the area of the light beam at the pupil P where the condenser lens system II includes the plain parallel plate IIa. The rectangle Q represents the area of the light beam.

Figure 2C:
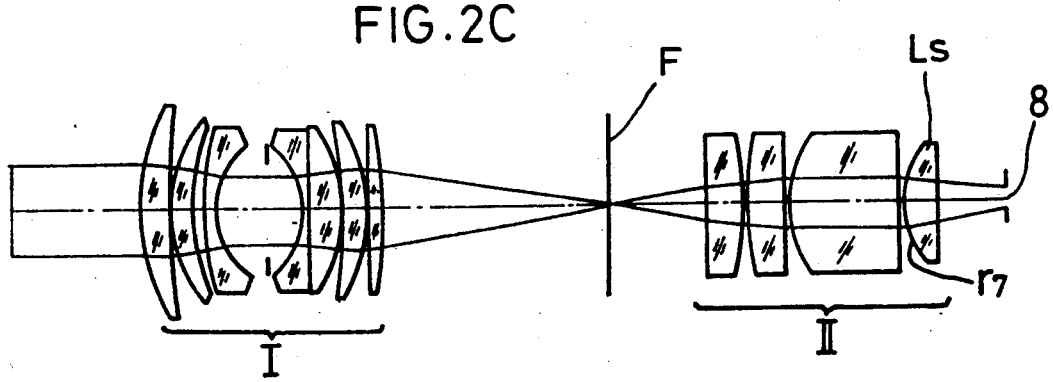
Figure 2D:
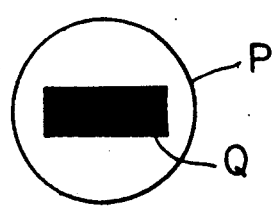
FIGS. 2D and 2E are views illustrating widths of beams from a filament occurring at a pupil of a projecting lens group in the first embodiment.
Figure 2E:
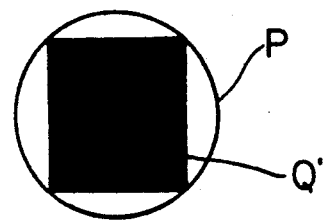

FIG. 2C shows a sagittal section in which the condenser lens system II includes a cylindrical lens Ls having the constant on-axial thickness as the plain parallel plate IIa. Its meridional section is the same as shown in FIG. 2B. FIG. 2E shows the area Q' of the light beam at the pupil P in this state.

Comparing FIGS. 2D and 2E, the beam area Q' resulting from the use of cylindrical lens Ls shown in FIG. 2C is about 3.5 times the beam area Q. It shows that the condenser magnification in the sagittal direction is 3.5 times the condenser magnification in the meridional direction. The area Q shown in FIG. 3E is a square inscribing the pupil P, which is said to be an upper limit of illuminance while substantially maintaining the illuminance ratio in the meridional direction.

When only center illuminance is considered, illuminance can be increased to a degree of increasing the beam width overflowing the pupil P with the construction shown in FIG. 2C. In this case, the cylindrical convex lens Ls has a radius of curvature of 14.2.

If a surface r7 of the cylindrical convex lens Ls is directed toward the light source 8, spherical aberration will be increased to make it difficult to obtain an illuminance ratio in the sagittal direction which is perpendicular to the slit. It is therefore desirable to set the cylindrical convex lens so that its convex surface is directed toward the projecting lens system I as shown in FIG. 2C.

Further, where the cylindrical lens is disposed close to the light source, the conjugate length is increased in the sagittal direction, thereby reducing halation of the source image at the entrance pupil. This enables the condenser magnification to be increased further, to promote the effect of the anamorphic illuminating optical system.

Figure 3A:
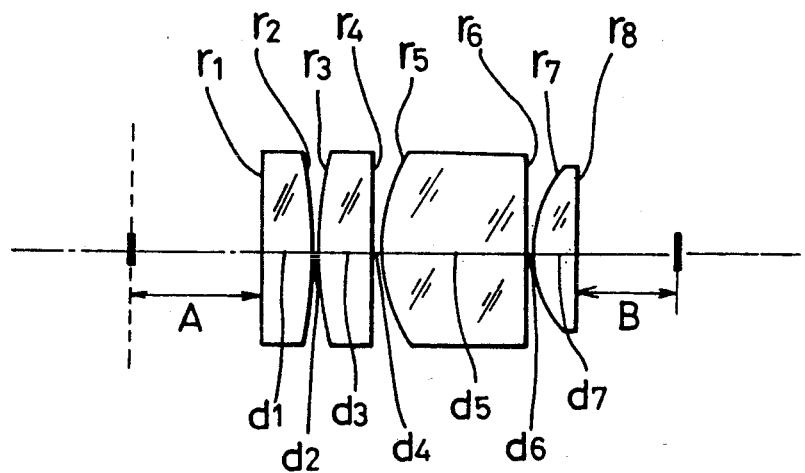
FIGS. 3A and 3B are sectional views of the anamorphic illuminating optical system in the first embodiment taken in a sagittal direction and in a meridional direction, respectively.
Figure 3B:
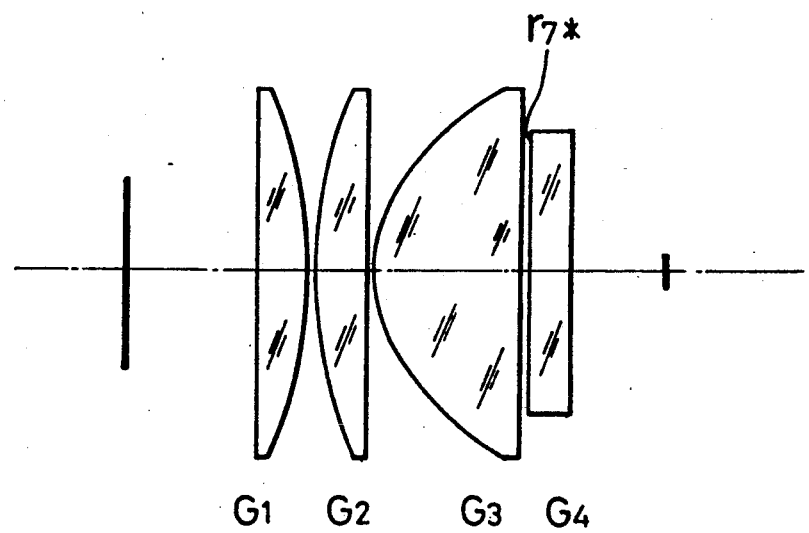

Table 1 shows specific examples of numeric values for this anamorphic illuminating optical system. FIGS. 3A and 3B show a sagittal section and a meridional section of its lens arrangement in a direction perpendicular to the slit, respectively, Table 1 shows, in the order from the left, enlargement side, numeric values for radii of curvature r1, r2, ... 8n, axial distances d1, d2, ... d7, refractive indices N1, N2, ... N4 at lines d of the lens components, and Abbe numbers of the lens components $\nu 1, \nu 2, \ldots \nu 4$.

The second lens G2 is formed of heat absorbing glass. The third lens G3 has an aspherical surface r5 which a surface of the second order. This aspherical surface is expressed by the following equation:

$$X = \frac{\phi^2}{r\left(1 + \sqrt{1 - \epsilon\left(\frac{\phi}{r}\right)^2}\right)}$$

where X is an axial distance from a flat surface intersecting the optical axis, $\phi$ is a distance perpendicular to the optical axis, r is a paraxial radius of curvature, and $\epsilon$ is a radius of curvature of the second order. Reference r7 denotes a cylindrical surface.

TABLE 1

| $f_1 = 19.60$ | $f_2 = 24.85$ |
|---|---|
| $S = 72.09$ | |
| $\beta_1 = -1/4.603$ | $\beta_2 = -1/2.982$ |

TABLE 1-continued

| A = 18.00 | | B = 13.00 | |
|---|---|---|---|
| RADIUS OF CURV. | AXIAL DISTANCE | REFRACT. IND.(Nd) | ABBE No.($\nu$d) |
| $r_1$ ∞ | | | |
| | $d_1$ 7.00 | $N_1$ 1.523 | $\nu_1$ 58.1 |
| $r_2$ −60.00 | | | |
| | $d_2$ 1.00 | | |
| $r_3$ 60.00 | | | |
| | $d_3$ 7.00 | $N_2$ 1.527 | $\nu_2$ 69.0 (HEAT RESISTING GLASS) |
| $r_4$ ∞ | | | |
| | $d_4$ 1.00 | | |
| $r_5$ 20.50 | | | |
| | $d_5$ 20.00 | $N_3$ 1.523 | $\nu_3$ 58.1 |
| $r_6$ ∞ | | | |
| | $d_6$ 1.00 | | |
| $r_7$* 15.60 ($r_7'$ = ∞) | | | |
| | $d_7$ 6.00 | $N_4$ 1.517 | $\nu_3$ 64.2 |
| $r_8$ ∞ | | | |
| | Ed = 43.00 | | |

$r_5$: ASPHERICAL SURFACE $\epsilon = 0.37$
$r_7$: CYLINDRICAL SURFACE

Second Embodiment

Figure 4A:
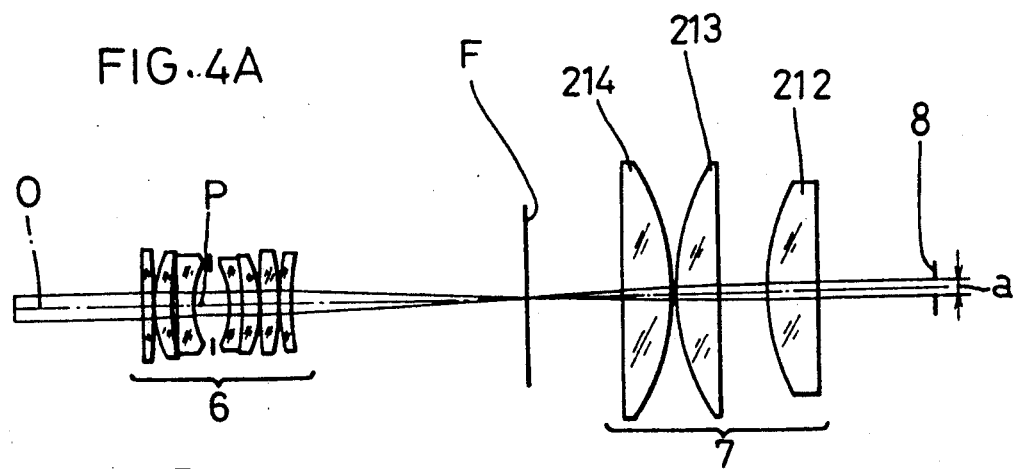
FIGS. 4A through 4C are views of optical paths illustrating an anamorphic illuminating optical system in a second embodiment of the present invention.
Figure 4B:
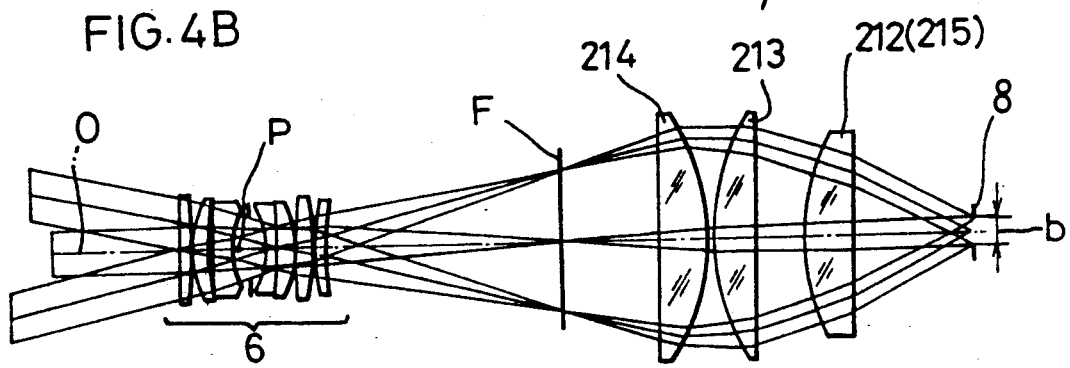

This embodiment relates to an improvement upon an illuminating optical system comprising lens components symmetric about an optical axis as shown in FIGS. 4A and 4B. FIG. 4A is a sectional view taken in a direction perpendicular to the slit (i.e. a sagittal section). FIG. 4B is a sectional view taken in the direction of the slit (i.e. a meridional section). These figures in combination show a state of beams from the light source 8.

The angles of view in the sagittal section shown in FIG. 4A clearly are smaller than those in the meridional section shown in FIG. 4B. However, the illuminance ratio must be secured for all angles of view in the condenser lens system 7 including lens components 212, 213 and 214 symmetric about the optical axis. Thus, the angles of view in the meridional section set a limit to the condenser magification, and wasteful illumination is provided in the sagittal section. FIG. 4D shows the width Q at the pupil P of the projecting lens of an on-axial light beam emitted from the filament of light source 8. Assuming that the filament has a rectangular shape a×b (a<b), there is some allowance left in the sagittal direction on the pupil P as seen from FIG. 4A.

The present invention forms the lens component 212 closest to the light source 8 as a toroidal lens by increasing its curvature in the sagittal section while leaving the curvature in the meridional section unchanged. Consequently, the power of the condenser lens is different between sagittal direction and meridional direction for improved illuminating efficiency.

Figure 4C:
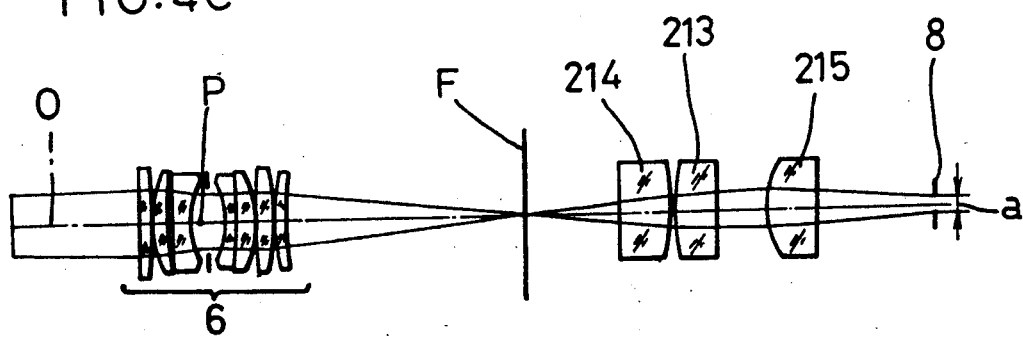
Figure 4D:
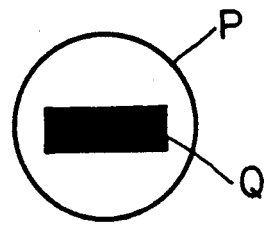
FIGS. 4D and 4E are views illustrating widths of beams from a filament occurring at a pupil of a projecting lens group in the second embodiment.
Figure 4E:
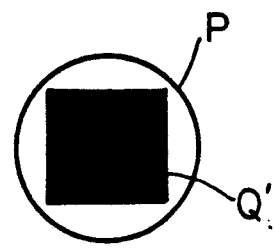

FIG. 4B shows optical paths as well as this lens construction in the meridional section, while FIG. 4C shows those in the sagittal section. FIG. 4E shows the beam width Q' at the pupil P of the projecting lens system 6. Comparing this beam with the beam shown in FIG. 4D, the beam shown in FIG. 4E has about 2.5 times an area of the beam shown in FIG. 4D. That is, the condenser magnification in the sagittal section is about 2.5 times the condenser magnification in the meridional section.

Figure 5B:
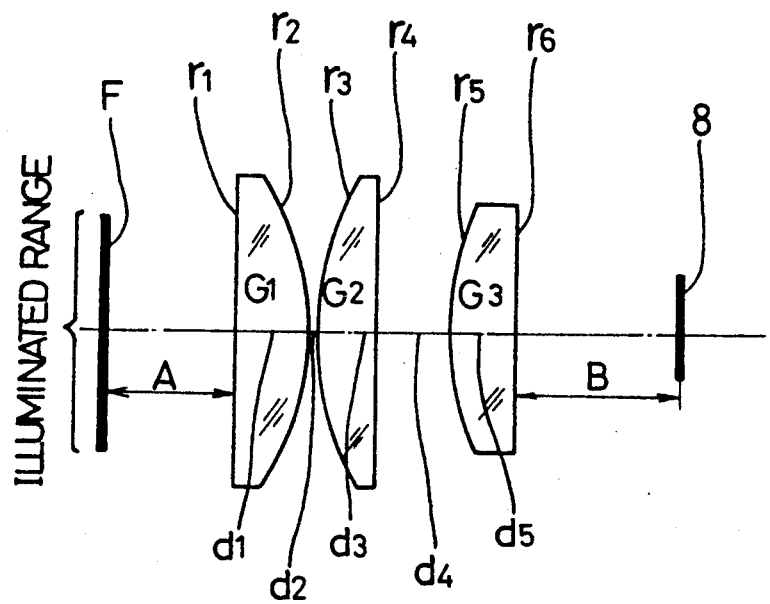
FIGS. 5A and 5B are sectional views of the anamorphic illuminating optical system in the second embodiment taken in a sagittal direction and in a meridional direction, respectively.
Figure 5A:
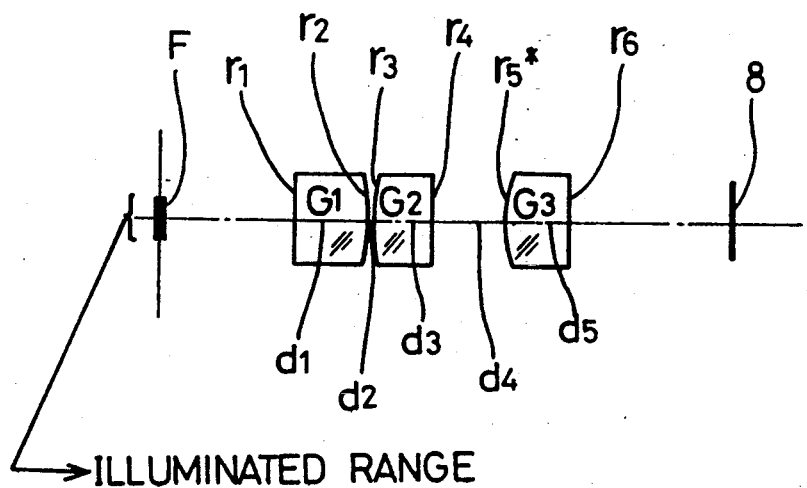

Table 2 shows specific examples of numeric values for the second embodiment. FIGS. 5A and 5B show a sagittal section and a meridional section of the lens arrangement based on such numeric values, respectively. A toroidal lens G3 defines a toroidal surface r5 at the front, with curvature r5 in the sagittal plane at 40.0 and curvature r5* in the meridional plane at 10.0. Where there is a distance S of 58.8 between a pupil P on the reduction side of the projecting lens system 6 and film plane F, paraxial magnification ratios in the sagittal section and meridional section, respectively, are; $\beta_1 = -1/2.1$ and $\beta_2 = -1/3.3$. References f1 and f2 denote focal lengths in the sagittal section and in the meridional section, respectively.

Third Embodiment

Figure 6A:
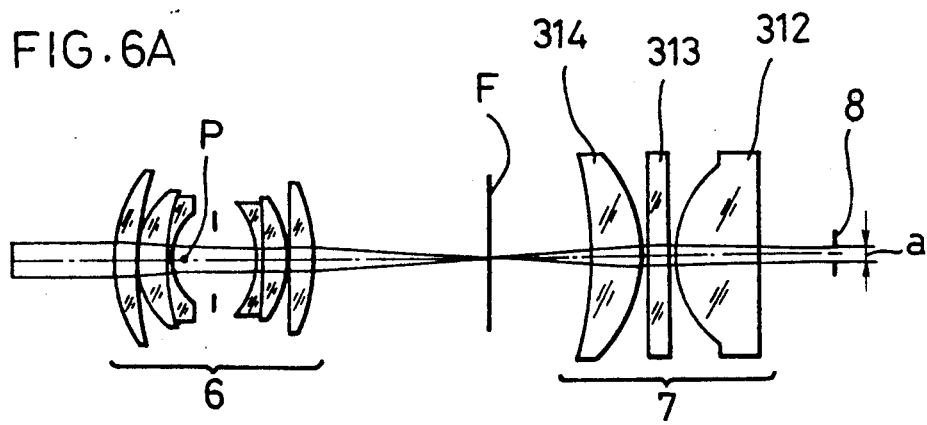
FIGS. 6A through 6C are views of optical paths illustrating an anamorphic illuminating optical system in a third embodiment of the present invention.

This embodiment employs a different condenser lens to the second embodiment. FIGS. 6A and 6C show optical paths in a conventional example relating to the third embodiment and including lens components symmetric about the optical axis. In the second embodiment, the lens component closest to the light source comprises a toroidal lens. In this embodiment, the lens component 314 remotest from the light source comprises a toroidal lens 315. With the toroidal lens disposed in this position, convex surfaces alone would result in an increase in spherical aberration in

TABLE 2

| RADIUS OF CURV. | | AXIAL DISTANCE | REFRACT. IND.(Nd) | | ABBE No.(νd) |
|---|---|---|---|---|---|
| $r_1$ | ∞ | | | | |
| | | $d_1$ | 10.0 | $N_1$ 1.5168 | $\nu_1$ 64.2 |
| $r_2$ | −37.0 | | | | |
| | | $d_2$ | 1.0 | | |
| $r_3$ | 40.0 | | | | |
| | | $d_3$ | 8.0 | $N_2$ 1.5168 | $\nu_2$ 64.2 |
| $r_4$ | ∞ | | | | |
| | | $d_4$ | 10.0 | | |
| $r_5$ | 40.0 | | | | |
| $r_5$* | 10.0 | | | | |
| | | $d_5$ | 9.0 | $N_3$ 1.5168 | $\nu_3$ 64.2 |
| $r_6$ | ∞ | | | | |
| | | Ed = | 38.0 | | |

$f_1 = 29.3$   $f_2 = 22.0$
WHEN S = 58.5 (DISTANCE FROM PUPIL AT REDUCTION SIDE OF PROJECTING LENS TO FILM PLANE)
$\beta_1 = -1/2.1$, $\beta_2 = -1/3.3$ directions away from the optical axis, thereby projecting the filament image onto the film plane. In this embodiment, a concave surface is inserted to lessen the degree of spherical aberration.

The anamorphic lens 315 is disposed at the remotest position from the light source in view of the problem of thermal gradient applied to the axially symmetric lens components by the anamorphic lens 315. In the preceding second embodiment, thermal gradient occurs with the lens components arranged rearwardly of the anamorphic lens, in a direction perpendicular to the line. As a result, the lens components could be damaged by the heat from the light source or the degree of beam condensation by the toroidal lens. This may be prevented by cutting the lenses to a track shape or coating the lenses. If such measures cannot be taken, anamorphic illumination may be realized by arranging the lens components as in the third embodiment.

Figure 6B:
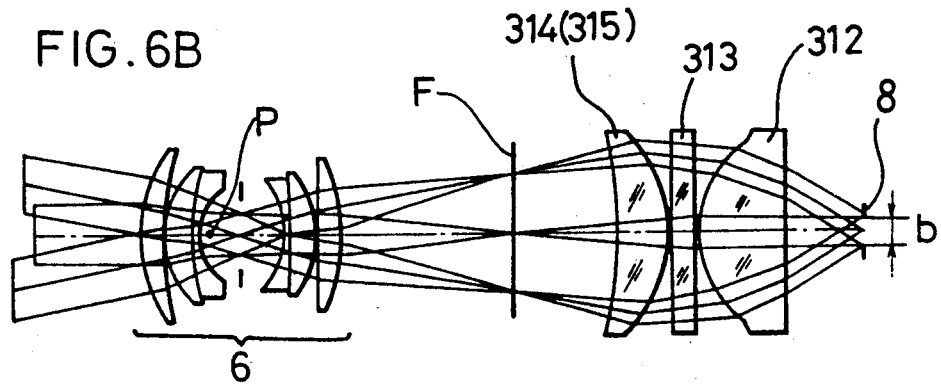
Figure 6C:
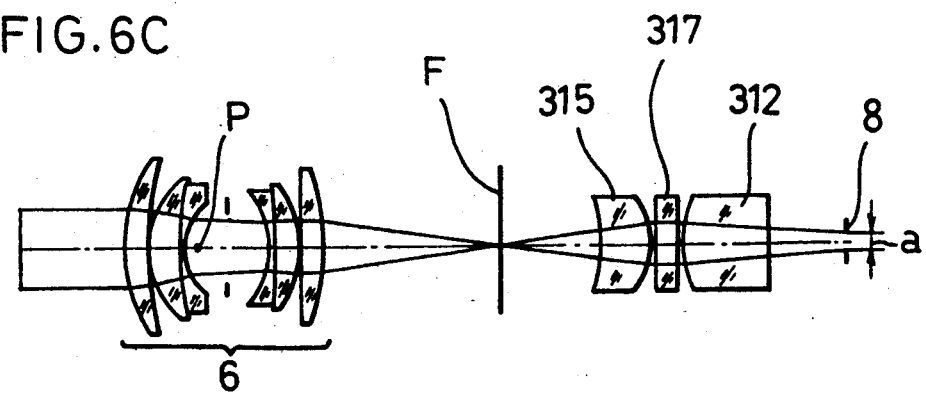
Figure 6D:
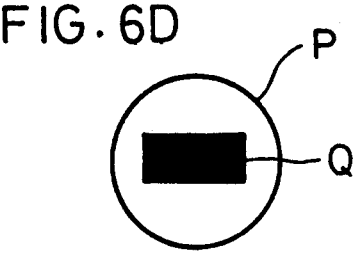
FIGS. 6D and 6E are views illustrating widths of beams from a filament occurring at a pupil of a projecting lens group in the third embodiment.
Figure 6E:
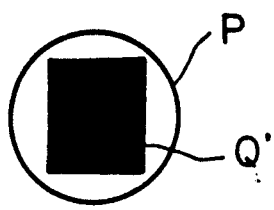

FIGS. 6B and 6C show optical paths in the lens construction including the above toroidal lens. FIG. 6D shows the beam width Q at the pupil P of the projecting lens system, which occurs with the spherical lens system. FIG. 6E shows the beam width occurring with the third embodiment. It will be seen that the latter has a beam area Q' increased about 2.2 times.

Figure 7B:
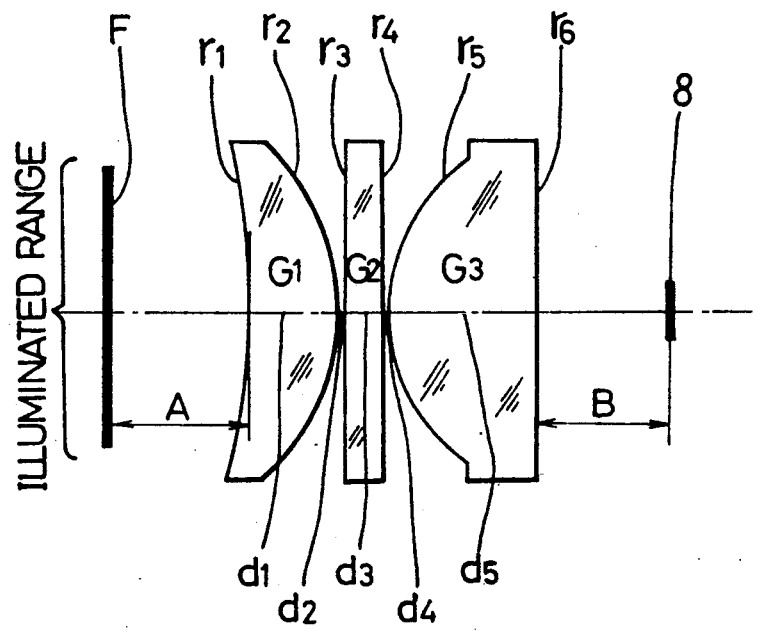
FIGS. 7A and 7B are sectional views of the anamorphic illuminating optical system in the third embodiment taken in a sagittal direction and in a meridional direction, respectively.
Figure 7A:
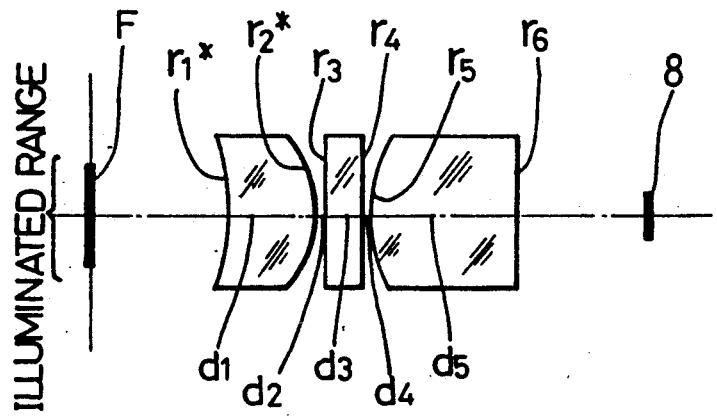

Table 3 shows specific examples of numeric values for the third embodiment. FIGS. 7A and 7B show a sagittal section and a meridional section of the lens arrangement based on such numeric values, respectively.

The third lens G3 is an aspherical lens whose aspherical surface has been described in the first embodiment.

Fourth Embodiment

In this embodiment, the anamorphic illuminating optical system of the type described in the first embodiment is employed in a film scanner of the film moving, slit exposure type.

Figure 8A:
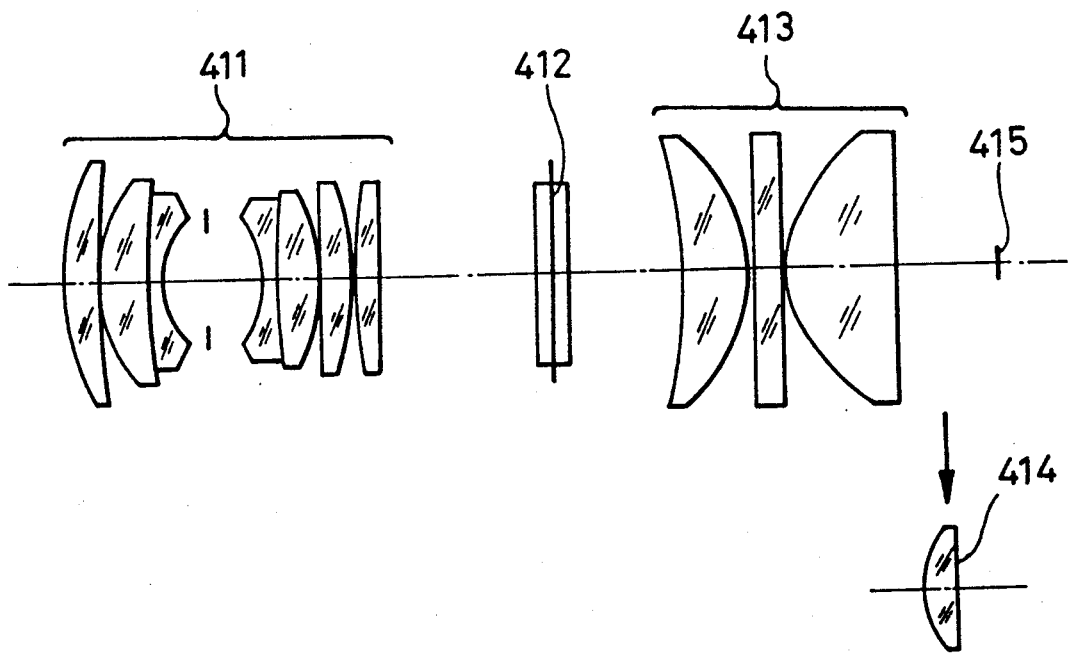
FIGS. 8A and 8B are sectional views taken in a vertical direction and in a direction of a slit, respectively, of an optical system in a microfilm reader/printer as engaged in a printing operation, this optical system forming a fourth embodiment of the present invention.
Figure 8B:
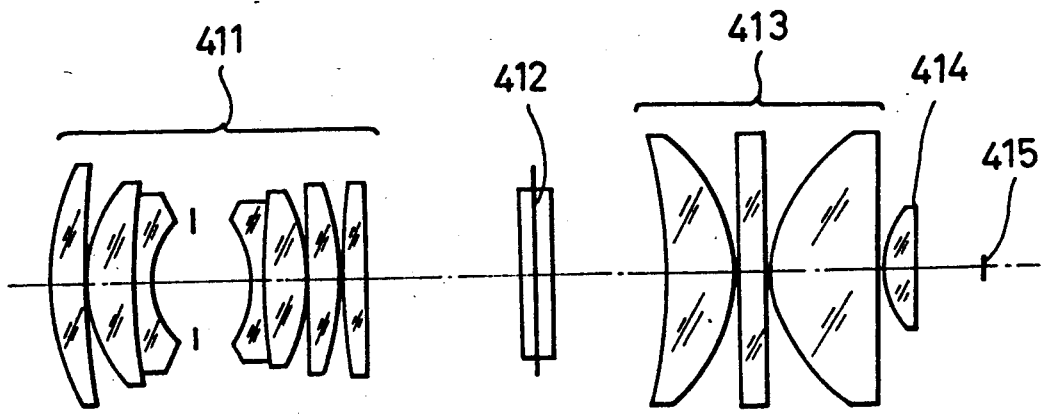

FIGS. 8A and 8B are sectional views of the optical system in a microfilm reader/printer of the film scan type. FIG. 8A shows a condition of the illuminating optical system during a reading operation. This construction includes, from the left, enlargement side, a projecting lens system 411, a

TABLE 3

| RADIUS OF CURV. | | AXIAL DISTANCE | REFRACT. IND.(Nd) | ABBE No.(νd) |
|---|---|---|---|---|
| $r_1$ | −90.0 | | | |
| $r_1$* | −29.0 | | | |
| | | $d_1$ 12.0 | $N_1$ 1.5230 | $\nu_1$ 64.2 |
| $r_2$ | −29.0 | | | |
| $r_2$* | −14.0 | | | |
| | | $d_2$ 1.0 | | |
| $r_3$ | ∞ | | | |
| | | $d_3$ 5.0 | $N_2$ 1.5250 | $\nu_2$ 64.2 |
| $r_4$ | ∞ | | | (HEAT RESIST- |
| | | $d_4$ 1.0 | | ING GLASS) |
| $r_5$ | 20.5 | | | |
| | | $d_5$ 20.0 | $N_3$ 1.5230 | $\nu_3$ 64.2 |
| $r_6$ | ∞ | | | |
| | | Ed = 39.0 | | |

$f_1 = 26.3$   $f_2 = 19.8$
ASPHERICAL SURFACE COEFFICIENT ($r_5$) $\epsilon = 0.37$
WHEN S = 74.5,
$\beta_1 = -1/3.2$, $\beta_2 = -1/4.5$ microfilm 412 supported by thick glass plates, a condenser lens system 413 and light source 115, all arranged on an optical axis. A cylindrical lens 414 remains off the optical axis.

FIG. 8B shows a condition of the illuminating optical system during a printing operation. In this condition, the cylindrical lens 414 is inserted between the light source 415 and condenser lens system 413 to establish an anamorphic illuminating optical system.

Illuminance may be increased in this anamorphic illuminating system since the cylindrical convex lens 414 increases condenser magnification in a direction perpendicular to the slit over a direction of the slit.

Figure 9A:
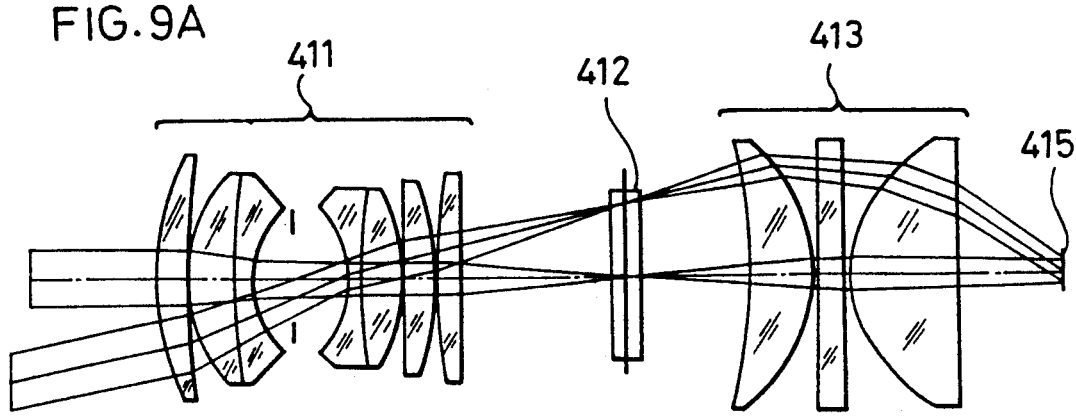
FIG. 9A is a view, seen in the direction of the slit, of optical paths of the fourth embodiment as engaged in a reading operation.
Figure 9B:
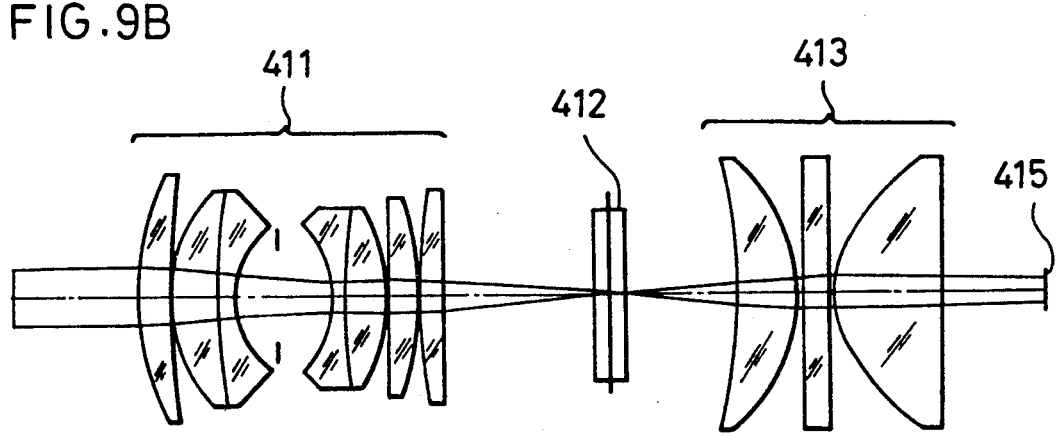
FIG. 9B is a view, seen in a direction perpendicular to the slit, of optical paths of the fourth embodiment as engaged in the reading operation.
Figure 9C:
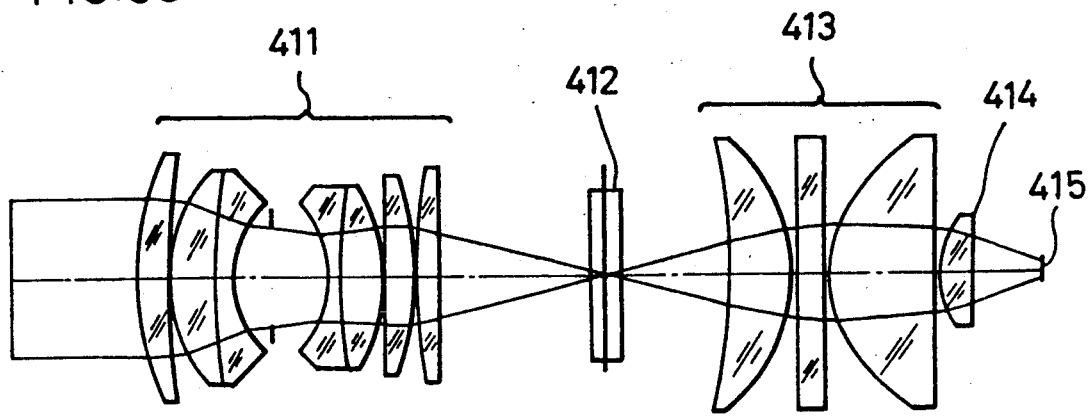
FIG. 9C is a view, seen in the direction perpendicular to the slit, of optical paths of the fourth embodiment as engaged in the printing operation.

This feature will particularly be described with reference to FIGS. 9A through 9C. FIG. 9A is a view of optical paths extending from a given point on a photoreceptor in the direction of the slit during a reading operation. FIG. 9B is a view of optical paths extending in the direction perpendicular to the slit. FIG. 9C is a view of optical paths in the direction perpendicular to the slit during a printing operation.

Comparing beans emitted from an on-axial point in FIG. 9A and those in FIG. 9C, it will be seen that condenser magnification is greater in FIG. 9C than in FIG. 9A.

The angle of view for projecting an image, i.e. illuminating range, is far smaller in the direction perpendicular to the slit than in the direction of the slit. It is therefore unnecessary to take the illuminance ratio in the direction perpendicular to the slit into account. Thus, by inserting the cylindrical convex lens 414 to reduce the focal length of the condenser lens system 413, condenser magnification is increased as a matter of course since the distance of the projecting lens system 411 to the pupil is constant.

Figure 10:
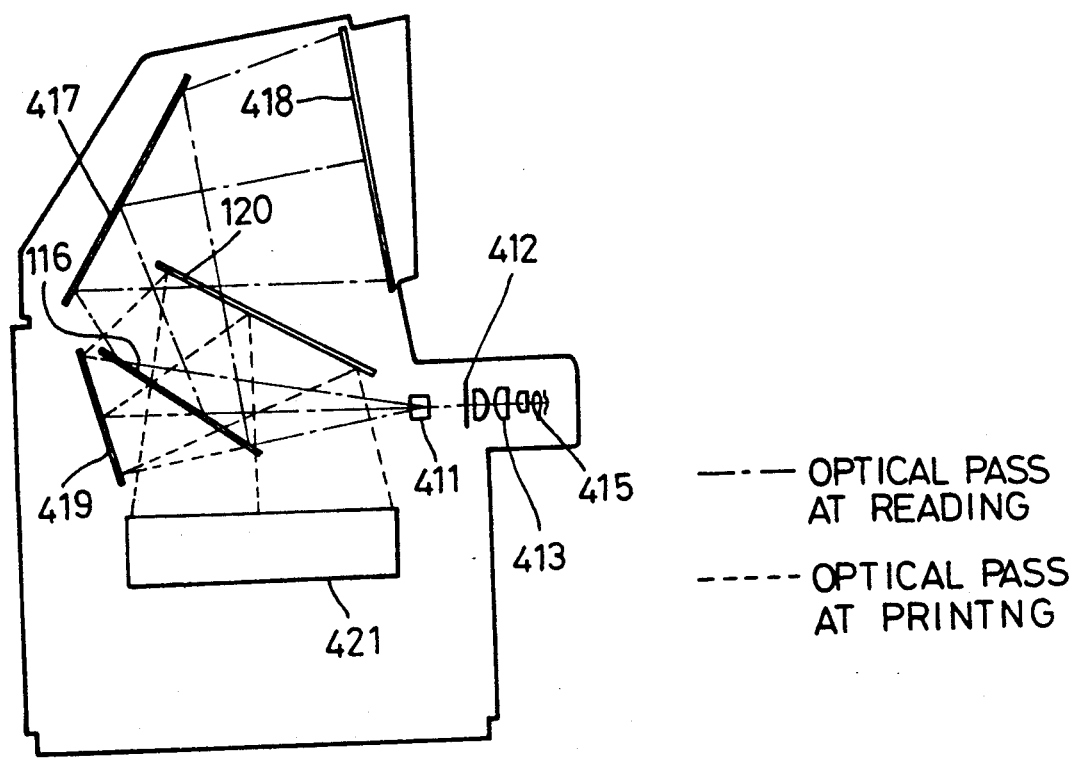
FIG. 10 is a view of optical paths of the microfilm reader/printer as engaged in the reading operation according to the fourth embodiment.
Figure 11:
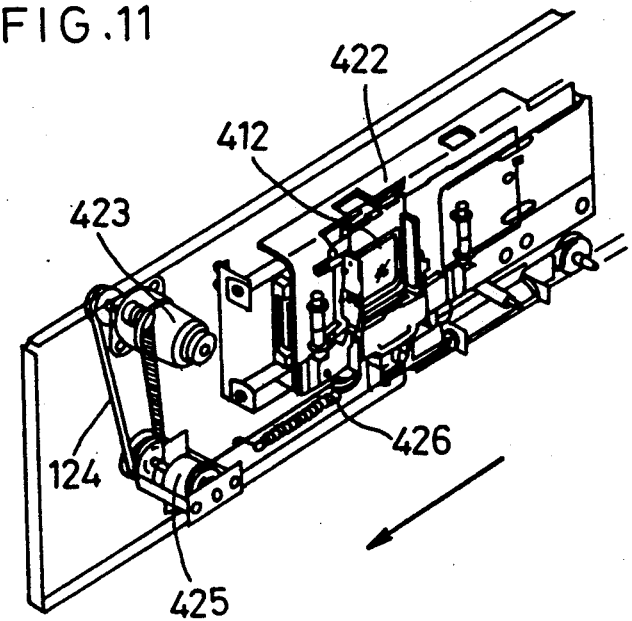
FIG. 11 is a perspective view of a film carriage included in FIG. 10, FIG. 12A and 12B are a top plan view and a front view of a drive mechanism for driving a condenser lens system included in FIG. 10, respectively.

The microfilm reader/printer employing the condenser lens system as constructed above will be described next with reference to the drawings. FIG. 10 is a view of optical paths illustrating the microfilm reader/printer. Light from the light source 415 is condensed by the condenser lens system 413 to illuminate the microfilm 412. The image of the illuminated microfilm 412, during a reading operation, is projected by the projecting lens system 411, reflected by mirrors 416 and 417, and projected onto a screen 418 for observation, as indicated by a dot-and-dash line. During a printing operation, as indicated by a dotted line, the image is reflected by mirrors 419 and 120, and projected onto a photoreceptor drum 421. As shown in FIG. 11, the microfilm 412 is contained in a film carriage 422 movable in the direction indicated by an arrow. The film carriage 422 is driven by a motor 423 through a belt 124, a scan clutch 425 and a drive wire 426.

Figure 12A:
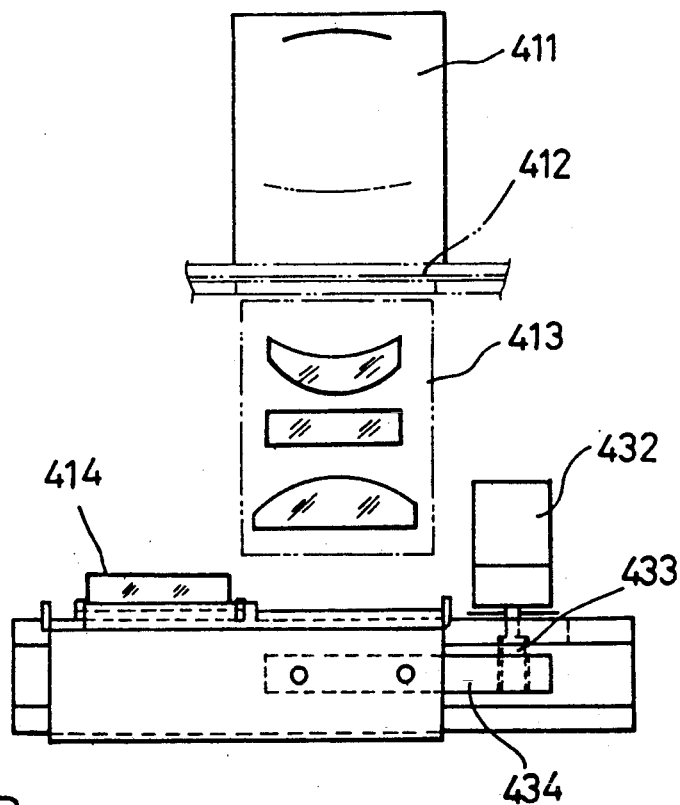
Figure 12B:
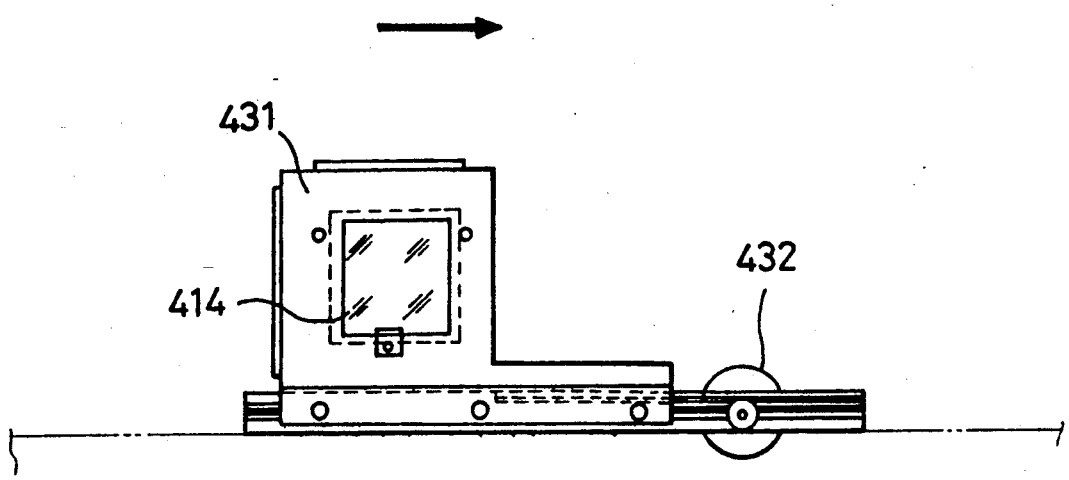

As shown in FIGS. 12A and 12B, the condenser lens system 413 has the cylindrical lens 414 supported by a lens holder 431. A motor 432 has an output shaft fixedly carrying a pinion 433 meshed with a rack 434. Rotation of the motor 432 moves the lens holder 431 rightward as indicated by an arrow, thereby placing the cylindrical lens 414 on the optical path. This construction readily switches from the reading state shown in FIGS. 12A and 12B to the printing state shown in FIG. 8B, by driving the motor 432 to move the cylindrical lens 414. Conversely, switching may also be made from the printing state to the reading state by displacing the cylindrical lens 414.

Fifth Embodiment

In this embodiment, the anamorphic illuminating optical system of the type described in the second and third embodiments is employed in a film scanner of the film moving, slit exposure type.

Figure 13A:
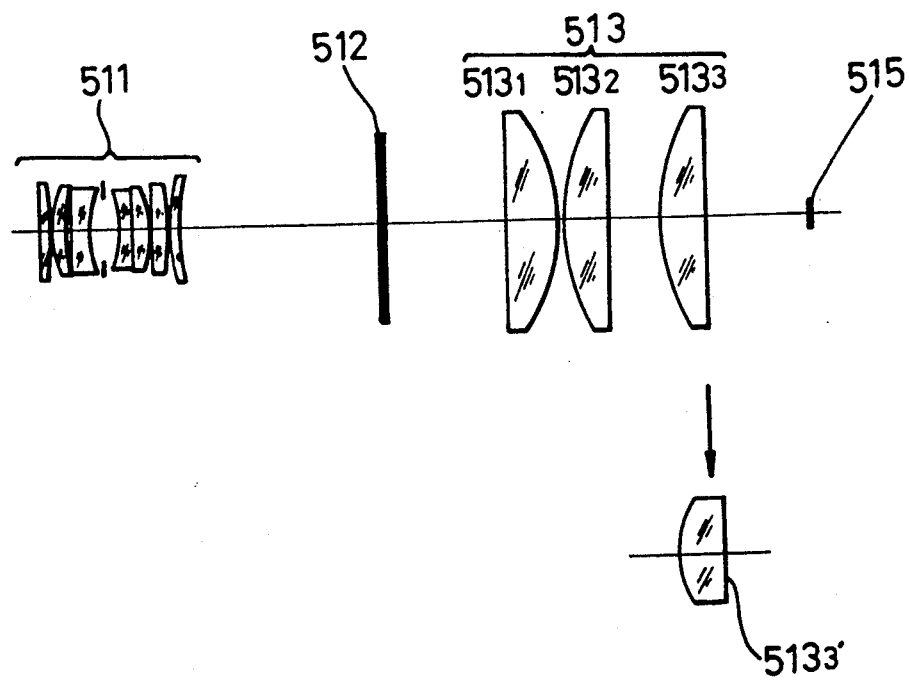
FIGS. 13A and 13B are sectional views taken in a vertical direction and in a direction of a slit, respectively, of an optical system in a microfilm reader/printer as engaged in a printing operation, this optical system forming a fifth embodiment of the present invention.
Figure 13B:
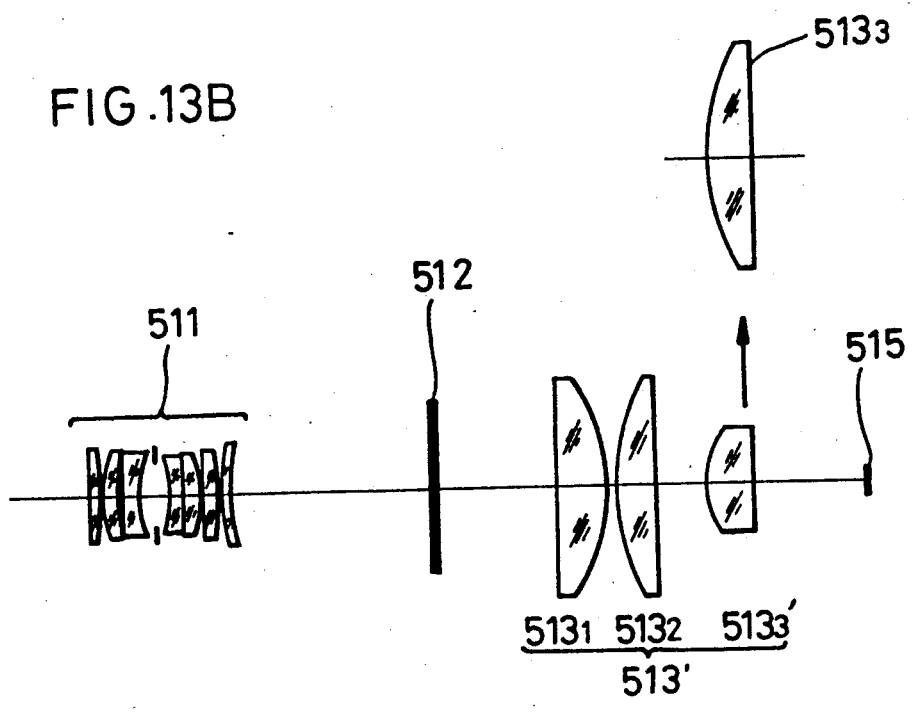

FIGS. 13A and 13B are sectional views of the optical system in a microfilm reader/printer of the film scan type. FIG. 13A shows a condition of the illuminating optical system during a reading operation. This construction includes, from the left, enlargement side, a projecting lens system 511, a microfilm 512 supported by thick glass plates, a condenser lens system 513 and light source 115, all arranged on an optical axis. The condenser lens system II includes axially symmetric lens components 5131, 5132 and 5133. A toroidal lens 5133' remains off the optical axis.

FIG. 13B shows a condition of the illuminating optical system during a printing operation. In this condition, the toroidal lens 5133' is moved onto the optical path in place of the condenser lens component 5133 opposed to the light source 515 to establish an anamorphic illuminating optical system 513'.

Illuminance may be increased in this anamorphic illuminating system 513' since the toroidal lens 5133' increases condenser magnification in a direction perpendicular to the slit over a direction of the slit.

Figure 14A:
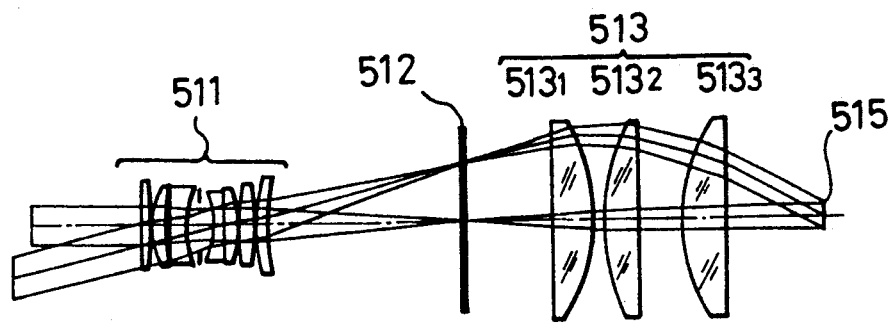
FIG. 14A is a view, seen in the direction of the slit, of optical paths of the fifth embodiment as engaged in a reading operation.
Figure 14B:
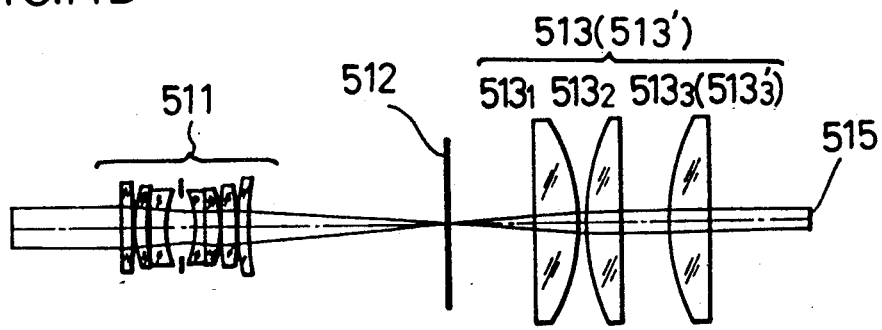
FIG. 14B is a view, seen in a direction perpendicular to the slit, of optical paths of the fifth embodiment as engaged in the reading operation.
Figure 14C:
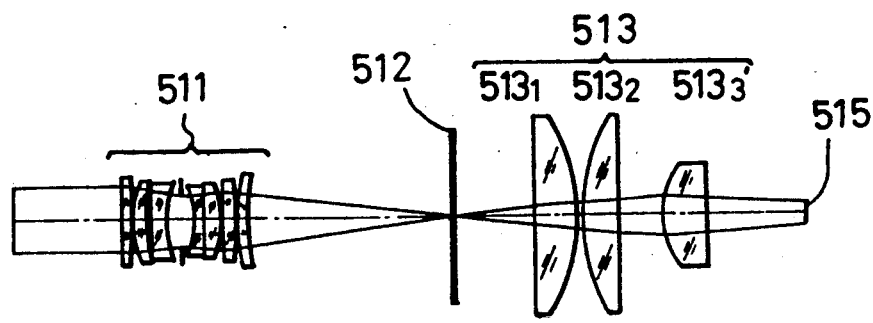
FIG. 14C is a view, seen in the direction perpendicular to the slit, of optical paths of the fifth embodiment as engaged in the printing operation.

This feature will particularly be described with reference to FIGS. 14A through 14C. FIG. 14A is a view of optical paths extending from a given point on a photoreceptor in the direction of the slit during a reading operation. FIG. 14B is a view of optical paths extending in the direction perpendicular to the slit. FIG. 14C is a view of optical paths in the direction perpendicular to the slit during a printing operation. The state of optical paths extending in the direction of the slit during the printing operation is the same as shown in FIG. 14B.

Comparing beans emitted from an on-axial point in FIG. 14A and those in FIG. 14C, it will be seen that condenser magnification is greater in FIG. 14C than in FIG. 14A.

The angle of view for projecting an image, i.e. illuminating range, is far smaller in the direction perpendicular to the slit than in the direction of the slit. It is therefore unnecessary to take illuminance ratio in the direction perpendicular to the slit into account. Thus, by inserting the toroidal lens 5133' to reduce the focal length of the condenser lens system 513', condenser magnification is increased as a matter of course since the distance of the projecting lens system 511 to the pupil is constant.

The microfilm reader/printer employing the condenser lens system as constructed added is similar to the fourth embodiment described with reference to FIGS. 10 and 11.

Figure 15A:
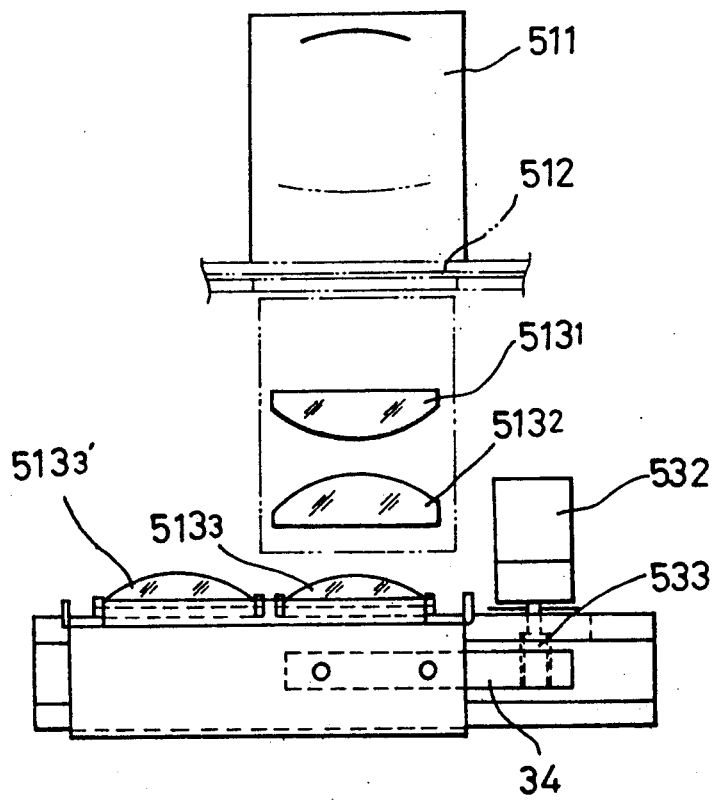
FIG. 15A and 15B are a top plan view and a front view of a drive mechanism for driving a condenser lens system included in the fifth embodiment, respectively.
Figure 15B:
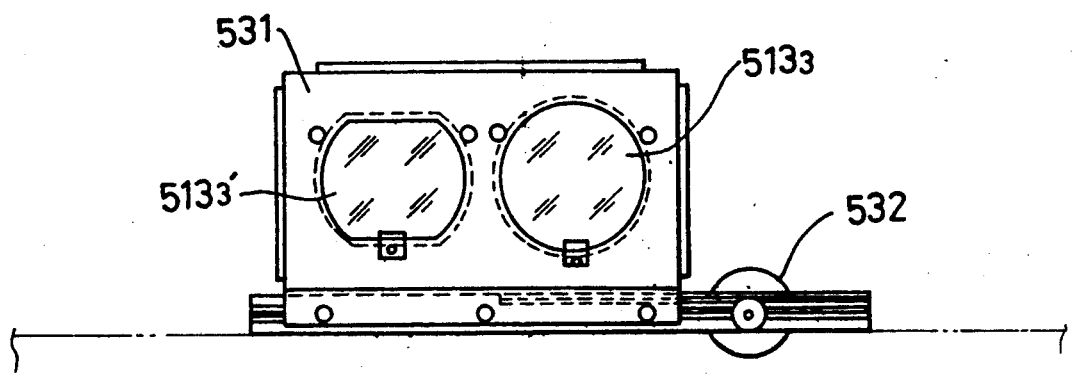
Figure 16:
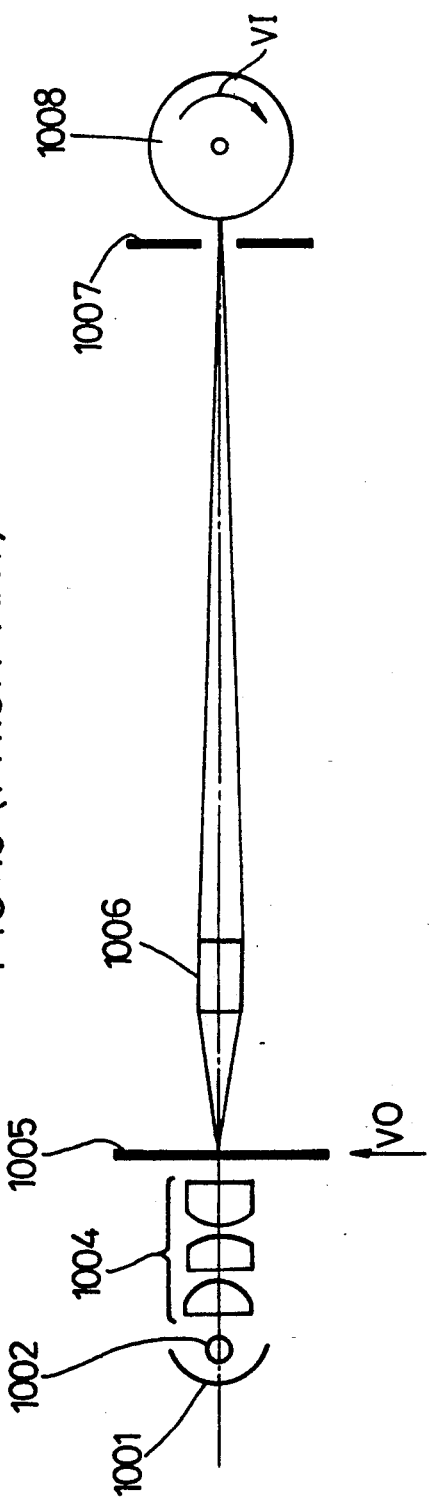
FIG. 16 is a sectional view of a conventional microfilm reader/printer of the film scan type.
Figure 17:
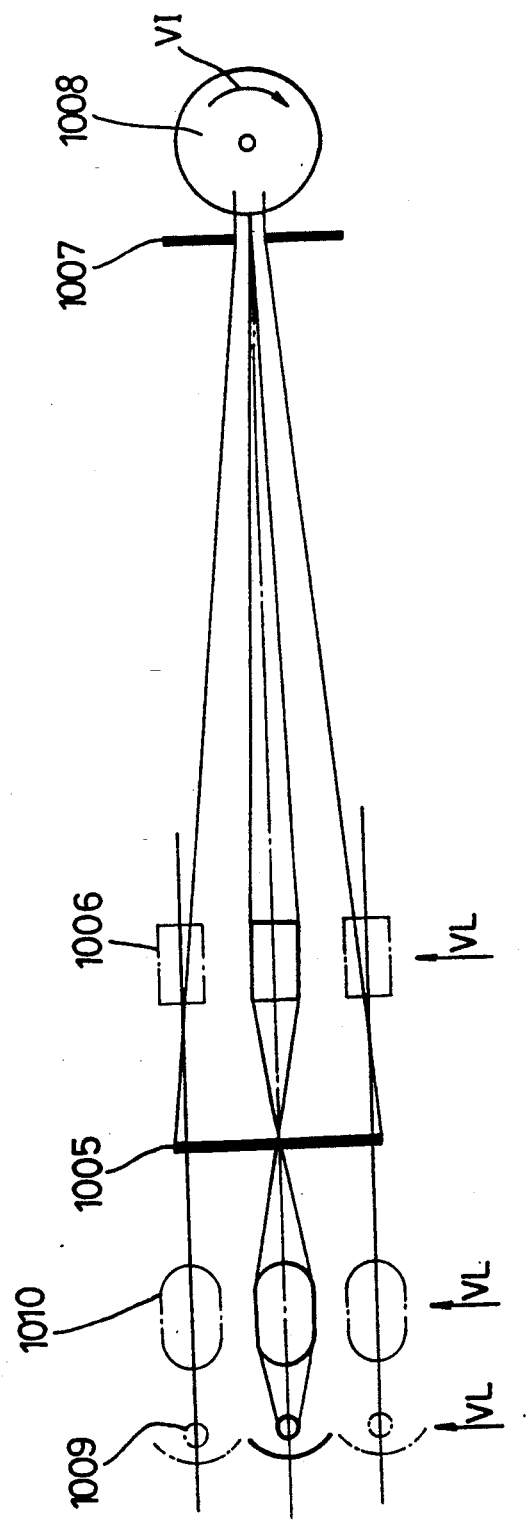
FIG. 17 is a sectional view of a conventional microfilm reader/printer of the lens scan type.

Referring to FIGS. 15A and 15B, the condenser lens system 513 or 513' has the axially symmetric lens 5133 and toroidal lens 5133' supported by a lens holder 531. A motor 532 has an output shaft fixedly carrying a pinion 533 meshed with a rack 534. Rotation of the motor 532 moves the lens holder 531 in the direction indicated by an arrow. This construction enables switching from the reading state shown in FIGS. 15A and 15B to the printing state, by driving the motor 532 to move the toroidal lens 5133' onto the optical axis, thereby establishing the anamorphic illuminating optical system 513'. Conversely, switching may be made from the printing state to the reading state by moving the axially symmetric lens to establish the ordinary illuminating optical system 513.

This construction secures a sufficient illuminance ratio for the reading operation, and improves the illuminance ratio for the printing operation to increase the number of copies.

In the fourth and fifth embodiments, the lens switching relative to the optical axis is carried out through the sideways sliding movement. Alternatively, the switching may be effected by a turret-like rotation. Further, although the described microfilm reader/printers are the film scan type, the present invention may of course be applied equally well to microfilm reader/printer of the lens scan type.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A projecting apparatus comprising:
    a light source;
    an illuminating optical system for condensing light from said light source and illuminating a film with the condensed light, said illuminating optical system including an axially symmetric lens system fixedly disposed on an optical axis, and an anamorphic lens system movable between a first position and a second position, a projecting lens for projecting an image of the film illuminated;

a first mode for causing said projecting lens to project the image of the film onto a first projection plane;

a second mode for causing said projecting lens to project the image of the film onto a second projection plane;

first moving means for moving said anamorphic lens system to said first position in said first mode; and second moving means for moving said anamorphic lens system to said second position in said second mode.

2. The projecting apparatus as claimed in claim 1, wherein said first position is on said optical axis, and said second position is retracted from said optical axis.

3. The projecting apparatus as claimed in claim 1, wherein said first mode is a mode for slit-projecting an image of the film, and said second mode is a mode for illuminating an entire image area of the film.

4. The projecting apparatus as claimed in claim 1, wherein said first projection plane is a photoreceptor or light receiving elements arranged in a line, and said second projection plane is a screen.

5. The projecting apparatus as claimed in claim 1, wherein said anamorphic lens system includes a cylindrical lens.

6. The projecting apparatus as claimed in claim 1, wherein said anamorphic lens system includes a toroidal lens.

* * * * *